United States Patent [19]

Anderson et al.

[11] Patent Number: 5,115,962
[45] Date of Patent: May 26, 1992

[54] METHOD OF ATTACHING CERAMIC FIBER ARRAYS TO METALLIC SUBSTRATES

[75] Inventors: David W. Anderson, Tequesta; John H. E. Baker, II, Palm Beach Gardens; Thomas E. O'Connell, North Palm Beach, all of Fla.

[73] Assignee: United Technologies Corporation, Hartford, Conn.

[21] Appl. No.: 286,836

[22] Filed: Dec. 20, 1988

[51] Int. Cl.⁵ .................. B23K 1/00; B23K 31/02
[52] U.S. Cl. ................................................. 228/120
[58] Field of Search ............... 228/120, 121, 122, 124, 228/233.12; 164/97

[56] References Cited

U.S. PATENT DOCUMENTS

| | | | |
|---|---|---|---|
| 2,531,782 | 11/1950 | Moore | 228/254 |
| 4,075,364 | 2/1978 | Panzera | 228/120 |
| 4,120,641 | 10/1978 | Myles | 228/120 |

Primary Examiner—Samuel M. Heinrich
Attorney, Agent, or Firm—Charles E. Sohl

[57] ABSTRACT

Methods are described for attaching ceramic fibrous bodies to metallic substrates. Metal fibers or metal wires are woven into the ceramic fibrous body which is to be adjacent the substrate and the exposed portion of these fibers or wires is attached by brazing to the substrate.

8 Claims, 1 Drawing Sheet

METHOD OF ATTACHING CERAMIC FIBER ARRAYS TO METALLIC SUBSTRATES

The Government has rights in this invention pursuant to a contract awarded by the Department of the Air Force.

DESCRIPTION

1. Technical Field

This invention relates to the attachment of ceramic fiber arrays, such as ceramic fiber felts and woven ceramic fiber structures, to metallic substrates.

2. Background Art

Superalloys are widely used for high temperature applications especially in the field of gas turbine engines. Such materials have exceptionally good properties at elevated temperatures up to very near their melting point. However the increasing demands for high temperature operation have raised operating temperatures to the point where superalloys are marginal for some required applications.

Ceramic materials are also used in gas turbine engines though only to a limited extent. Ceramics have very high temperature capabilities, but suffer from lack of ductility and lack of toughness in bulk form. This renders them subject to catastrophic brittle failure.

There are problems in joining bulk ceramic parts to metal parts because of the difference in their coefficients of thermal expansion. The coefficient of expansion of metals is much greater than that of ceramics and thus it is difficult to join ceramics to metal without encountering cracking and failure of the ceramic during heating.

Thin ceramic fibers have significant flexibility and it is known to form ceramic fibers into arrays, either random arrays such as a felt or complex woven arrays. Woven arrays may be of a two-dimensional nature such as a cloth, or may be true three-dimensional arrays formed by weaving fibers in three or more directions. Such structures are very interesting and have potentially great value for high temperature applications because of their flexibility and resistance to brittle failure. Woven and nonwoven ceramic fibers arrays find wide application from exotic aerospace applications to mundane applications such as oven gaskets.

Recently a superalloy component in a gas turbine engine, produced by the present assignee, required thermal insulation and it was decided that a woven fiber ceramic structure would be an ideal solution if it could be securely attached to the metallic substrate. To the best of the knowledge of the inventors a durable attachment of a woven ceramic structure to a superalloy substrate, has not previously been accomplished.

Accordingly, it is an object of the invention to teach a method for attaching woven ceramic fiber arrays, both woven and nonwoven, to metallic substrates.

It is another object of the invention to disclose a metallic substrate having a protective ceramic fiber array affixed firmly thereto.

DISCLOSURE OF INVENTION

According to the present invention a ceramic fiber array is modified by adding metallic wires or metallic fibers to one face thereof. By suitably weaving or otherwise mechanically interlocking the wires or fibers to one face of the fiber ceramic array, the fiber ceramic array may be firmly attached to a metallic substrate by brazing the metallic fibers or wires to the array substrate.

The foregoing and other features and advantages of the present invention will become more apparent from the following description and accompanying drawings.

BEST MODE FOR CARRYING OUT THE INVENTION

Figure 1:
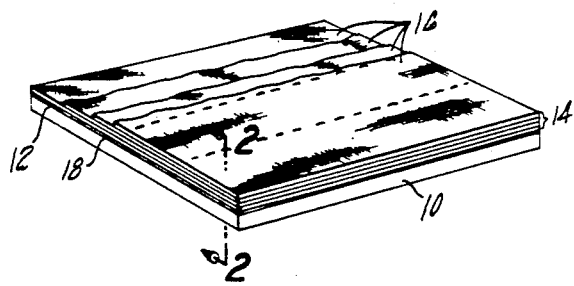
FIG. 1 shows a woven fiber ceramic array containing thin metal wires woven into one face thereof.

Ceramic fiber arrays are a known article of commerce and may be comprised of a variety of ceramic fibers including for example, alumina, silica, mullite, silicon carbide, boron nitride and the like and mixtures thereof with exemplary fiber diameters of 1–30 microns. One preferred fiber is that sold by 3M Corporation under the name Nextel TM which comprises (by weight) 62% $Al_2O_3$, 24% $SiO_2$ and 14% $B_2O_3$ and having a fiber diameter of 7–13 microns. These fibers may be woven using conventional weaving technology. Such woven structures are commonly termed two dimensional when they form a cloth type structure and three dimensional when significant amounts of fibers are woven through the thickness of the material. Ceramic fibers are also available in the form of felt which is a nonwoven structure wherein the fibers are randomly arrayed and are sufficiently interlocked and interwoven to provide structural integrity.

Such ceramic fiber arrays in both woven and nonwoven form will have particular utility in the invention in thicknesses from about 0.020 to 1.0 inch and will usually be employed in sheet form.

Ceramic fiber articles are used as insulating materials and are commonly adhered or bonded to substrates or to each other by ceramic bonding materials (i.e. cements) or by mechanical retention means. Ceramic fibers are generally not easily wet by metals so bonding techniques such as brazing are not generally successful.

According to the invention a plurality of metal fibers or wires are woven through the ceramic fiber structure with portions of the metal fibers or wires being exposed at one surface of the ceramic fiber structure. When done under proper conditions the fiber layer with exposed metal constituents can be brazed to a metallic substrate.

In one embodiment of the invention an existing ceramic fiber structure can have a plurality of fine wires woven into one surface thereof. This can be done by hand in small quantities or by machine. Metallic wires for example on the order of 10 mils in diameter of suitable materials such as Chromel TM (90% Ni, 10% Cr) a trademark of the Hoskins Mfg. Co. or Nichrome TM (80% Ni, 20% Cr) a trademark of the Driver-Harris Wire Co., can be woven through an existing fiber structure and can provide points of exposed wire on one surface ranging from about 3 to about 15 per linear inch. Once the wire weaving is complete the ceramic structure with the interwoven wires can be brazed to the desired metallic substrate using an appropriate braze material.

Since the ceramic fiber will usually be applied for thermal insulation it is generally important that the interwoven wires not penetrate or approach the surface of the ceramic which will be exposed to high service temperatures. Depending on the exact operating conditions and the brazing material used if the wires penetrate the surface which is to see the high temperatures sufficient heat can be conducted through the wires to the brazed substrate to weaken the braze joint and cause failure. Accordingly it is generally desired that the wires are maintained in the half of the thickness of the ceramic fiber array which will be adjacent to the substrate to which bonding is desired.

The fine wire can have long and continuous lengths wherein a single length of wire provides multiple points of exposure for brazing. Alternatively short sections of wire can be woven through the ceramic (for example resembling staples) so that each short section of wire comprises only a single or few contact points.

Another embodiment of the invention comprises weaving metallic fibers into the ceramic fiber array during array fabrication. In this case the metallic fibers will usually be smaller in diameter than the wires used in the previous embodiment and more numerous and will therefore provide from about 10 to 100 contact points per linear inch for brazing. Again in this embodiment it is generally desirable to limit the metallic fibers to the half of the ceramic fiber array which is adjacent the metal substrate.

In the case of ceramic felt, the felt can be fabricated in a layered fashion with metallic fibers being present only adjacent one free surface. Alternately a plurality of separate felts can be fabricated with one of the felts having a concentration of metallic fibers and these felts can then be joined together by stitching or with ceramic fibers or other techniques known in the art.

Figure 2:
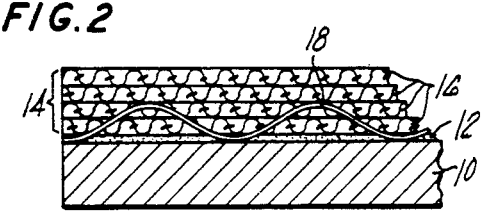
FIG. 2 shows a cross-section through the structure of FIG. 1.
Figure 3:
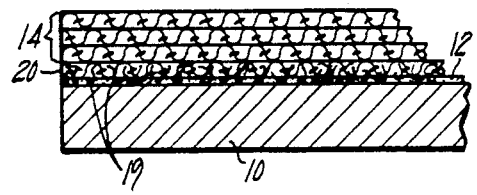
FIG. 3 shows an alternate structure to that shown in FIG. 2.

FIG. 1 shows an embodiment of the present invention. Shown in FIG. 1 is a metallic substrate 10 having on one surface a layer of braze material 12 located on the braze material 12 is a woven structure 14 shown as a plurality of layers 16. Woven into the woven structure 14 are a plurality of fine wires shown as 18 where these wires project from the exposed surface in contact with the braze layer 12. FIG. 2 is a sectional view through FIG. 1 showing in greater detail the substrate layer 10, braze layer 12, and the undulating wire 18 which projects from the surface of the woven ceramic structure 14 and makes contact with the braze layer 12. It can be seen in FIG. 2 that the wire 18 is firmly attached to the substrate 10 by the layer of braze material 12 and that the rest of the ceramic fiber structure 14 is mechanically interlocked by the wire 18 and held firmly to the substrate-braze layer 10/12. FIG. 3 is an alternate embodiment to that shown in FIG. 2 wherein in place of a wire 18 is shown a plurality of fine metal fibers 19 which are interwoven with a portion 20 of the woven ceramic structure 14.

Figure 4:
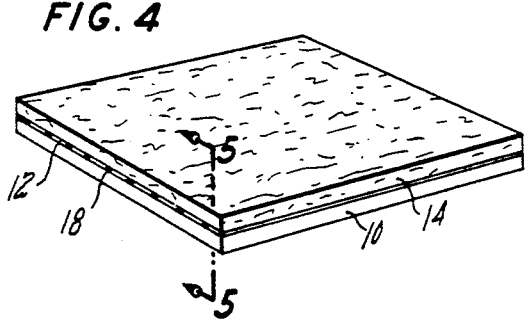
FIG. 4 shows a nonwoven ceramic fiber felt containing thin metal wires woven into one interface thereof.
Figure 5:
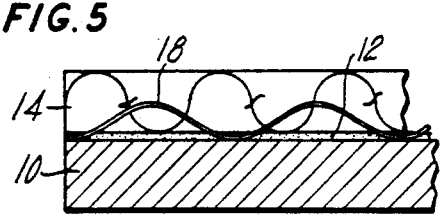
FIG. 5 shows a cross-section through the structure shown in FIG. 4.
Figure 6:
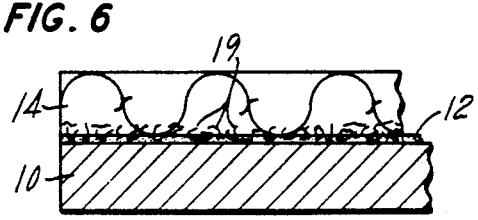
FIG. 6 shows an alternate structure to that shown in FIG. 2.

The teachings illustrated in FIGS. 4, 5 and 6 are analogous to those FIGS. 1, 2 and 3 except that instead of being a woven structure the structure in FIGS. 4, 5 and 6 is a ceramic felt.

We prefer to cut the ceramic fiber arrays using a high power laser, for example a $CO_2$ laser, since this fuses the fiber ends and reduces fraying and fiber loss during handling, fabrication, and in service.

The bonded metallic substrate-ceramic fiber arrays of the invention have primary application for thermal insulation.

Although this invention has been shown and described with respect to detailed embodiments thereof, it will be understood by those skilled in the art that various changes in form and detail thereof may be made without departing from the spirit and scope of the claimed invention.

We claim:

1. A method for attaching a fibrous ceramic body to a metal substrate which comprises:
    weaving a plurality of wires through the fibrous body with at least a portion of the woven wires being exposed at one face of the fibrous body, and brazing the exposed wire portions to the metal substrate.

2. A method as in claim 1 wherein the ceramic fibrous body is a woven structure.

3. A method as in claim 1 wherein the ceramic fibrous body is a randomly oriented structure.

4. A method as in claim 1 wherein the woven wires are located only in that portion of the ceramic fibrous body which is adjacent the metal substrate.

5. A method for attaching a fibrous ceramic body to a metallic substrate which comprises:
    weaving a plurality of metal fibers into the ceramic fibrous body during its fabrication and brazing the multiple ceramic fibers to the metallic substrate.

6. A method as in claim 5 wherein the ceramic fibrous structure is a woven body.

7. A method as in claim 5 wherein the ceramic fibrous body is a randomly oriented ceramic felt.

8. A method as in claim 5 wherein the metallic fibers are located only in that portion of the ceramic fibrous body which is adjacent to the metallic substrate.

* * * * *